United States Patent
Parr et al.

(10) Patent No.: US 11,223,580 B1
(45) Date of Patent: Jan. 11, 2022

(54) OPTIMIZED CONVERSATION ROUTING FOR UNIFIED MULTI-PLATFORM CHATBOTS

(71) Applicant: Octane AI, Inc., San Francisco, CA (US)

(72) Inventors: Benjamin Parr, San Francisco, CA (US); Megan Berry, New York, NY (US); Matt Schlicht, Irvine, CA (US)

(73) Assignee: Octane AI, Inc., San Francisco, CA (US)

( * ) Notice: Subject to any disclaimer, the term of this patent is extended or adjusted under 35 U.S.C. 154(b) by 378 days.

(21) Appl. No.: 16/042,111

(22) Filed: Jul. 23, 2018

Related U.S. Application Data

(60) Provisional application No. 62/554,602, filed on Sep. 6, 2017.

(51) Int. Cl.
*G06F 16/95* (2019.01)
*H04L 12/58* (2006.01)
*G06F 16/332* (2019.01)
*G06F 40/20* (2020.01)

(52) U.S. Cl.
CPC .......... *H04L 51/02* (2013.01); *G06F 16/3329* (2019.01); *G06F 40/20* (2020.01); *H04L 51/32* (2013.01)

(58) Field of Classification Search
CPC ..... H04L 51/02; H04L 51/32; G06F 16/3329; G06F 17/27
See application file for complete search history.

(56) References Cited

U.S. PATENT DOCUMENTS

| | | | | |
|---|---|---|---|---|
| 8,965,422 | B2 * | 2/2015 | Khan | H04L 51/18 455/466 |
| 10,630,840 | B1 * | 4/2020 | Karp | H04L 51/046 |
| 2008/0003964 | A1 * | 1/2008 | Alperin | H04M 3/5233 455/185.1 |
| 2010/0056183 | A1 * | 3/2010 | Oh | H04L 67/18 455/456.3 |
| 2011/0131520 | A1 * | 6/2011 | Al-Shaykh | H04L 12/281 715/772 |
| 2011/0170675 | A1 * | 7/2011 | Mikan | H04L 51/066 379/88.14 |

(Continued)

*Primary Examiner* — Chris Parry
*Assistant Examiner* — Dixon F Dabipi
(74) *Attorney, Agent, or Firm* — Muirhead and Saturnelli, LLC

(57) ABSTRACT

Providing a consistent conversational experience to a user having multiple platform devices includes assigning each of a plurality of platform specific artificial conversational entities to at least one of the multiple platform devices using a chatbot integration platform of a particular messaging platform running on each of the devices or available conversational, interaction and integration capabilities of a messaging platform running on each of the devices, determining preferences of the user regarding timing and use on the multiple platform devices, and initially selecting a conversational venue corresponding to one of the multiple platform devices and a corresponding one of the platform specific artificial conversational entities according to routing logic that uses the preferences of the user and other factors. The preferences of the user may be determined using contact information of the user and social media profiles of the user.

30 Claims, 4 Drawing Sheets

(56) References Cited

U.S. PATENT DOCUMENTS

| | | | |
|---|---|---|---|
| 2011/0219105 A1* | 9/2011 | Kryze | G06F 15/16 709/223 |
| 2013/0212286 A1* | 8/2013 | Krishnakumar | H04L 29/06319 709/227 |
| 2014/0053054 A1* | 2/2014 | Shen | G06F 16/9577 715/234 |
| 2014/0136481 A1* | 5/2014 | Quan | G06F 9/4856 707/617 |
| 2015/0235143 A1* | 8/2015 | Eder | G06F 19/00 706/12 |
| 2016/0173540 A1* | 6/2016 | Linden | H04L 65/1083 705/26.8 |
| 2016/0342317 A1* | 11/2016 | Lim | G10L 15/22 |
| 2017/0180558 A1* | 6/2017 | Li | H04L 65/1089 |
| 2018/0054464 A1* | 2/2018 | Zhang | H04L 65/1096 |
| 2018/0063071 A1* | 3/2018 | Watson | H04L 51/04 |
| 2018/0089407 A1* | 3/2018 | Watson | G06F 21/32 |
| 2018/0089643 A1* | 3/2018 | Watson | G06Q 20/16 |
| 2018/0248817 A1* | 8/2018 | Licht | H04L 51/04 |
| 2018/0253985 A1* | 9/2018 | Aggarwal | G06N 20/00 |

\* cited by examiner

OPTIMIZED CONVERSATION ROUTING FOR UNIFIED MULTI-PLATFORM CHATBOTS

CROSS-REFERENCE TO RELATED APPLICATIONS

This application claims priority to U.S. Prov. App. No. 62/554,602, filed on Sep. 6, 2017, and entitled "OPTIMIZED CONVERSATION ROUTING FOR UNIFIED MULTI-PLATFORM CHATBOTS", which is incorporated herein by reference.

TECHNICAL FIELD

This application is directed to the field of optimization of content distribution through messaging applications, and more particularly to optimized conversation routing for unified multi-platform chatbots deployed across a variety of messaging applications and user devices.

BACKGROUND OF THE INVENTION

Following recent advances in messaging systems and Artificial Intelligence (AI), the market for chatbots (Artificial Conversation Entities, ACEs) is accelerating its growth and arguably represents one of the most important and promising AI application areas. By the most conservative industry forecasts, revenue generated by the global chatbots market may grow from approximately USD 191 million in 2016 to USD 1.25 billion by 2021. Other forecasts estimate the 2025 global chatbots market size to exceed nine billion USD. Experts agree that North America is and will remain the largest part of the market.

Chatbots are expected to transform the worldwide labor market and save as much as 25-30% on manpower costs over the next decade performing increasingly intelligent job functions. Thus, according to 2018 Gartner findings, 25% of customer service operations will use virtual customer assistants by 2020.

The adoption of chatbots is spearheaded by major social networks and by large technology companies that are offering chatbot development platforms and integration with messaging and other social applications, such as the FACEBOOK® brand MESSENGER™ messaging application, the SLACK® communication application, the MICROSOFT TEAMS® messaging application, TWITTER® social networking services, SNAPCHAT® services, etc. Other prominent chatbot technology solutions include the KIK® interactive website, NUANCE® services, the CREATIVE VIRTUAL™ conversational platform, IBM WATSON® Conversation Services and many others (a 2017 comparative review by the Chatbot Magazine lists at least 25 popular chatbot platforms). The majority of successful chatbots are running in popular messaging applications and are employing social and professional networks to connect to target users of the messaging applications and social and professional networks. For example, the seven best 2016 chatbots awarded by the ChatBottle search engine include five FACEBOOK® brand MESSENGER™ messaging applications and one of the SLACK® communication applications.

Market researchers underscore significant advantages of instant messaging platforms, such as the FACEBOOK® brand MESSENGER™ messaging application or the SLACK® communication application, over traditional email campaigns in retaining and engaging users. According to recent studies, the open rate by users of mobile instant messages is close to 98%, as opposed to email's 22%. Also, the retention rate for messaging applications at least doubles the retention rate for other types of applications. Advanced chatbot platforms integrated with leading messaging applications, such as Octane.ai for the FACEBOOK® brand MESSENGER™ messaging application, have proven to achieve engagement rates in the range 50%-90%.

In a "Chatbots Survey—2017" by Mindbowser, the three leading networks for chatbots development have been identified as the FACEBOOK® brand MESSENGER™ messaging application, company websites, and the SLACK® communication application, followed by other popular applications: TWITTER® social networking services, SKYPE® communication services, the KIK® interactive website, TELEGRAM™ software, WHATSAPP® communication services, etc. In order to target broader market coverage by chatbots applications, several companies, such as Message.io and Flow XO, are offering multi-platform solutions by cloning chatbots functionality across many networks and messaging applications. Such multi-platform conversions may save development time for chatbots builders and ensure consistent experiences for users of a chatbot application. For example, a company's customer service chatbot may benefit from deployment in different messaging applications and offer a dependable customer support to a larger user audience.

Notwithstanding significant advances in multi-platform chatbots development, some of the fundamental challenges of such solutions have not been addressed. For example, offering a single user with multiple devices and applications a consistent and optimal chatbots experience across multiple messaging applications adapted to user's preferences, available devices and applications, and situational analysis have not been explored or implemented.

Accordingly, it is desirable to create a mechanism for intelligent and optimized coordination and routing of conversations driven by a chatbot application to multiple user devices and messaging applications.

SUMMARY OF THE INVENTION

According to the system described herein, providing a consistent conversational experience to a user having multiple platform devices includes assigning each of a plurality of platform specific artificial conversational entities to at least one of the multiple platform devices using a chatbot integration platform of a particular messaging platform running on each of the devices or available conversational, interaction and integration capabilities of a messaging platform running on each of the devices, each of the plurality of artificial conversation entities providing conversation in at least one of a plurality of different formats on a subset of the platform devices, determining preferences of the user regarding timing and use on the multiple platform devices, and initially selecting a conversational venue corresponding to one of the multiple platform devices and a corresponding one of the platform specific artificial conversational entities according to routing logic that uses the preferences of the user and geographic location of the user, timing, which of the multiple platform devices are available and active, information about installed and registered messaging platforms and applications, situational analysis, and/or user feedback. The preferences of the user may be determined using contact information of the user and social media profiles of the user. A Superbot may coordinate use of particular ones of the platform specific artificial conversational entities. The preferences may be provided by having the user respond to a questionnaire a first time when the user encounters one of the platform specific artificial conversational entities. The installed and registered messaging platforms and applications may include a web browser, an email application, a unified or a specialized mobile and/or desktop messenger, social networks, and mobile and/or other SMS applications. The unified mobile and desktop messenger may be the FACEBOOK® brand MESSENGER™ messaging application, the SLACK® communication application, the MICROSOFT TEAMS® messaging application, TWITTER® social networking services, SNAPCHAT® services, LINE™ software, WECHAT® services, the KAKAO TALK® Internet chat rooms, SKYPE® communication services, WHATSAPP® communication services and/or VIBER® communication services. Providing a consistent conversational experience to a user having multiple platform devices may also include reselecting a new conversational venue corresponding to one of the multiple platform devices and a corresponding one of the platform specific artificial conversational entities using the routing logic module to assess the geographic location of the user, the timing, which of the multiple platform devices are available and active, the installed and registered messaging platforms and applications, the situational analysis, and/or the user feedback following initial communication with the user. Reselecting a new conversational venue may include providing a routing request by a Superbot to the routing logic module that chooses a conversation venue and designating by the Superbot a particular one of the platform specific artificial conversational entities for the new conversational venue. The Superbot may be provided in a cloud. The user may respond to the particular one of the platform specific artificial conversational entities. The user response may be analyzed using a natural language processing module that separates the response into a conversational portion in which the user converses with a particular one of the platform specific artificial conversational entities and an assessment portion in which the user evaluates suitability of the conversational venue. The conversational portion may include asking a question and/or providing information for a transaction to the particular one of the platform specific artificial conversational entities. The natural language processing module may determine user sentiment based on the assessment portion. Providing a consistent conversational experience to a user having multiple platform devices may also include reselecting a new conversational venue corresponding to one of the multiple platform devices according to user sentiment. Routing logic may be used to reselect the conversational venue and the user sentiment may be one of a plurality of factors that modify the routing logic.

According further to the system described herein, a non-transitory computer-readable medium contains software that provides a consistent conversational experience to a user having multiple platform devices. The software includes executable code that assigns each of a plurality of platform specific artificial conversational entities to at least one of the multiple platform devices using a chatbot integration platform of a particular messaging platform running on each of the devices or available conversational, interaction and integration capabilities of a messaging platform running on each of the devices, each of the plurality of artificial conversation entities providing conversation in at least one of a plurality of different formats on a subset of the platform devices, executable code that determines preferences of the user regarding timing and use on the multiple platform devices, and executable code that initially selects a conversational venue corresponding to one of the multiple platform devices and a corresponding one of the platform specific artificial conversational entities according to routing logic that uses the preferences of the user and geographic location of the user, timing, which of the multiple platform devices are available and active, information about installed and registered messaging platforms and applications, situational analysis, and/or user feedback. The preferences of the user may be determined using contact information of the user and social media profiles of the user. A Superbot may coordinate use of particular ones of the platform specific artificial conversational entities. The preferences may be provided by having the user respond to a questionnaire a first time when the user encounters one of the platform specific artificial conversational entities. The installed and registered messaging platforms and applications may include a web browser, an email application, a unified or a specialized mobile and/or desktop messenger, social networks, and mobile and/or other SMS applications. The unified mobile and desktop messenger may be the FACEBOOK® brand MESSENGER™ messaging application, the SLACK® communication application, the MICROSOFT TEAMS® messaging application, TWITTER® social networking services, SNAPCHAT® services, LINE™ software, WECHAT® services, the KAKAO TALK® Internet chat rooms, SKYPE® communication services, WHATSAPP® communication services and/or VIBER® communication services. The software may also include executable code that reselects a new conversational venue corresponding to one of the multiple platform devices and executable code that causes a corresponding one of the platform specific artificial conversational entities to use the routing logic module to assess the geographic location of the user, the timing, which of the multiple platform devices are available and active, the installed and registered messaging platforms and applications, the situational analysis, and/or the user feedback following initial communication with the user. executable code that reselects a new conversational venue may provide a routing request by a Superbot to the routing logic module that chooses a conversation venue where the Superbot designates a particular one of the platform specific artificial conversational entities for the new conversational venue. The Superbot may be provided in a cloud. The user may respond to the particular one of the platform specific artificial conversational entities. The user response may be analyzed using a natural language processing module that separates the response into a conversational portion in which the user converses with a particular one of the platform specific artificial conversational entities and an assessment portion in which the user evaluates suitability of the conversational venue. The conversational portion may include asking a question and/or providing information for a transaction to the particular one of the platform specific artificial conversational entities. The natural language processing module may determine user sentiment based on the assessment portion. The software may also include executable code that reselects a new conversational venue corresponding to one of the multiple platform devices according to user sentiment. Routing logic may be used to reselect the conversational venue and the user sentiment may be one of a plurality of factors that modify the routing logic.

The proposed system offers a consistent conversational experience across a variety of platforms simultaneously with intelligent and optimized routing of a chatbot driven conversation between multiple conversational venues. Each user may employ a permanent, expanding or shrinking set of mobile, desktop and web-based messaging applications, social network pages and posts, email and other communication mechanisms running on different devices and accessed by the user at different times, in different locations and under different circumstances. The system may learn from user preferences and feedback, in particular, by identifying user sentiments, to continuously improve routing of the conversation path. Architecturally, the system may deploy a Superbot, a set of platform bots and a routing engine that chooses an optimal conversation venue at each step of the conversation path.

System design phase starts with implementing a unified chatbot driven conversational sequence and experience across multiple mobile and online platforms, including messaging applications, such as the FACEBOOK® brand MESSENGER™ messaging application, the SLACK® communication application, the MICROSOFT TEAMS® messaging application, SMS, TELEGRAM™ software, WHATSAPP® communication services, TWITTER® social networking services, the KIK® interactive website, SKYPE® communication services, etc. Where a messaging application offers a chatbots integration platform to developers, the platform may be utilized. In case a chatbots developer environment is not part of a messaging solution, the system may use available conversational, interaction and integration capabilities of the messaging platform to emulate chatbot behavior, with due respect to limitations of the platform, for example, restrictions on the message length and available multimedia formats.

Depending on the features and limitations of each communications application participating in routing of conversations, every logical fragment of a chatbots driven conversation may vary in its content and format depending on the conversation venue. For example, conversation fragments delivered via SMS and TWITTER® social networking services take into account limitations of the text size and may use shortened links to cloud-based content if there is a need to expand such content. On the other hand, fragments of a conversation delivered via email may have embedded multimedia content and extended text. Additionally, textual content may be delivered in typed or in audio format; notifications and reminders about content delivery may also be part of conversational experience. The use of audio formats and voice input may not be limited to conversations delivered by chatbots on various platforms; fully interactive two-way conversations between a user and a chatbot assistant may also be part of a user experience, thanks to voice-driven AI platforms, such as the ALEXA® voice command and recognition system, the SIRI® voice command and recognition system or the GOOGLE HOME® voice command and recognition system.

When a user first encounters a chatbot driven conversation, say, on a web site of a consumer goods company, the system may offer the user a questionnaire to detect a starting list of conversation venues, that is, an initial set of devices and applications where the user may be interested to continue the conversation. Simultaneously, the system may also record the initial user preferences and rules on routing the conversation, which may include routing factors, such as location, time, device usage and other activities, together with routing logic. Examples of rules defining routing logic, along with conversation venues, provided by a user, may include:

When in the office, deliver text to Mac Messenger.
When traveling on business, deliver conversations (i) via voice to the SLACK® communication application on my iPhone between 8 am and noon; and (ii) via SMS text to my iPhone in the afternoon When on vacation, deliver conversations as text messages in the SLACK® communication application to my IPAD® tablet device after 10 am.

The set of conversation venues, routing factors, user preferences and rules may be periodically updated based on user feedback and other conditions and form a dynamic routing engine. Such customized routing engines are aimed at generating, for any given user, an optimal conversation venue at any point of the conversation path from beginning to end of user interaction with a chatbot.

Optimization criteria for the routing engine aim at increasing user convenience and, accordingly, maximizing user engagement with the chatbot. To this end, each chatbot instance for a particular platform may provide for user feedback, either in a structured format or using a freeform text. Such feedback may be processed using NLP (Natural Language Processing) technologies and other mechanisms allowing extraction of user sentiments from the feedback. Subsequently, the system may learn using various mechanisms, such as NN (Neural Networks) or SVM (Support Vector Machine) to update the routing engine for better user engagement. In this process, initial rules of the routing logic may be updated, may be used in parallel with NN classifiers or may be completely replaced by NN formalism. Additionally, user feedback may indicate new conversation venues; for example, a user may install new messaging applications, abandon old messaging applications, sign up for new cloud services and information systems, such as TWITTER® social networking services, acquire new devices where the system may be available, etc. Accordingly, both the list of conversation venues (that is, pairing of user devices with messaging platforms) and the routing logic for a particular user may be extended and modified in different ways, following and enhancing the conversation path.

System functioning may be described as follows:

1. Initialization—A user first encounters a chatbot conversation and may communicate an initial list of conversation venues, routing factors, and routing logic. A user profile may be created and a customized instance of a routing engine for the user may be built.
2. Conversation path—The Superbot may put a routing request to the routing engine. The routing engine monitors and assesses values of routing factors (time and date, user location, activities, available devices, recently used applications, etc.) and may use the most recent routing logic to identify and return to the Superbot an optimal conversation venue (device and application) under current conditions. Accordingly, the Superbot may activate the instance of chatbot for the corresponding platform and that platform chatbot makes the next step through a conversation path of the user by delivering the relevant fragment of conversation to the conversation venue in the needed format (possibly accompanied by notifications about switching the conversation venue).
3. User feedback and learning—User feedback, such as replies in the course of conversations with various instances of platform chatbots, captured at different steps along the conversation path, may be identified, processed (possibly using NLP and other techniques); user sentiments, additional conversation venues and other information may be retrieved from the feedback and delivered to the learning subsystem, which may modify the content and functioning of the routing engine to maximize user engagement.

BRIEF DESCRIPTION OF THE DRAWINGS

Embodiments of the system described herein will now be explained in more detail in accordance with the figures of the drawings, which are briefly described as follows.

DETAILED DESCRIPTION OF VARIOUS EMBODIMENTS

The system described herein provides a mechanism for optimization and continuous improvements in routing of multi-platform chatbot conversations, customized for set of messaging platforms, applications, devices of a user and adapted to preferences of the user through feedback analysis and machine learning.

Figure 1:
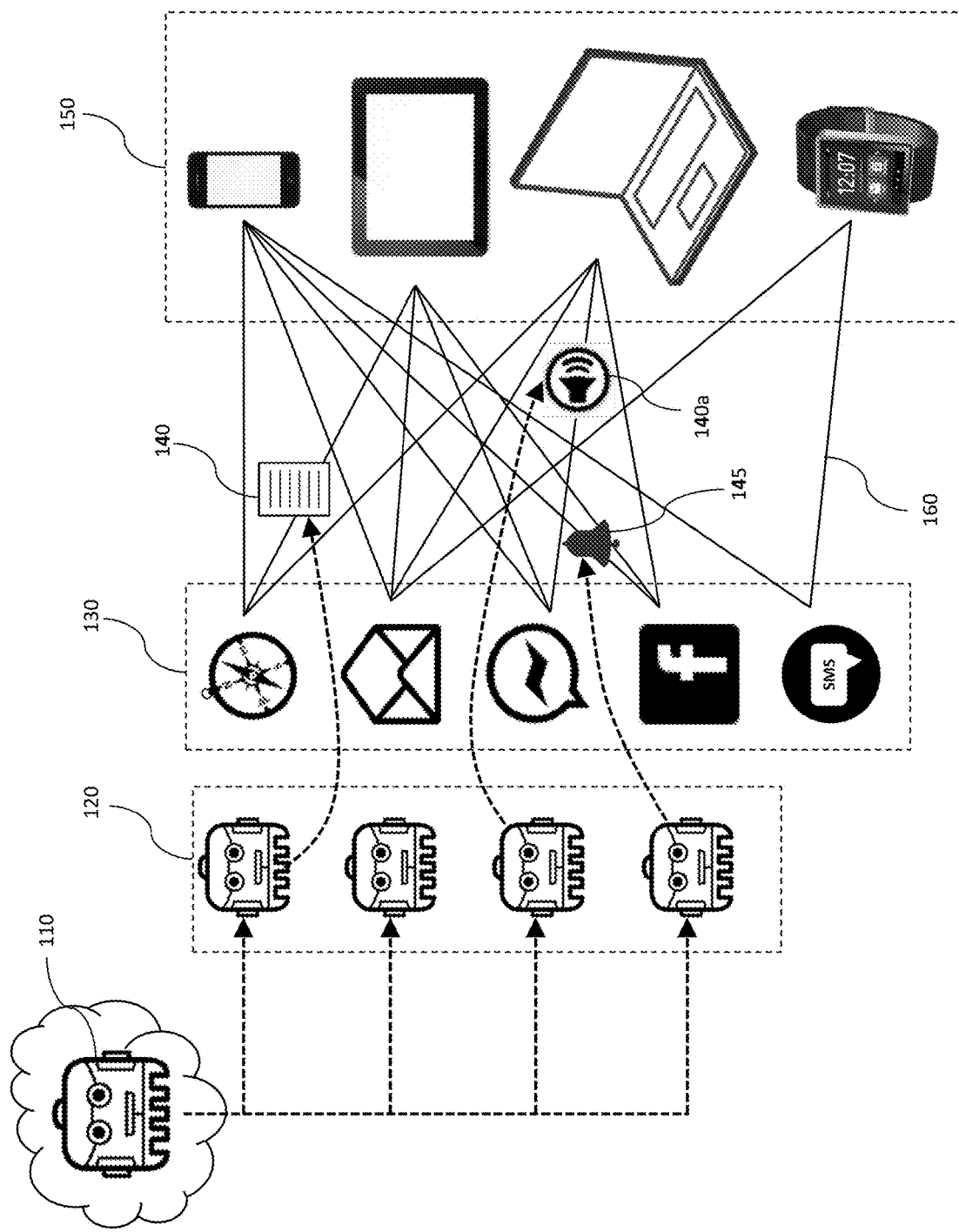
FIG. 1 is a schematic illustration of the multi-platform system architecture, according to an embodiment of the system described herein.

FIG. 1 is a schematic illustration 100 of a multi-platform system architecture. A Superbot 110, which may be cloud-based, monitors and directs a multi-platform pool of platform bots 120, providing conversational capabilities to users on a variety of messaging platforms and applications 130, such as web browsers, email applications, unified mobile and desktop messengers, social networks, mobile and other SMS applications, etc. Platform chatbots may provide conversations in multiple formats, such as text messages 140, voice messages 140a, etc. Platform chatbots may also include notifications and alerts 145 in the conversation stream. Chatbot driven conversations are delivered to user devices 150 that may include smartphones, tablets, notebooks, desktop computers, wearables and other appliances. Each of the platform bots 120 may be designed to communicate using a specific one or subset of the user devices 150. At any given phase of a conversation, the system may designate an optimal conversation venue 160, that is, a delivery route, wherein a user receives a message in a particular application running on a specific user device via an appropriate one of the platform bots 120. The system optimizes the conversational path, represented by a sequence of venues, chosen on the basis of user preferences, available and active user devices, installed and registered messaging platforms and applications, situational analysis, and user feedback, processed and utilized by the machine learning components of the system.

Figure 2:
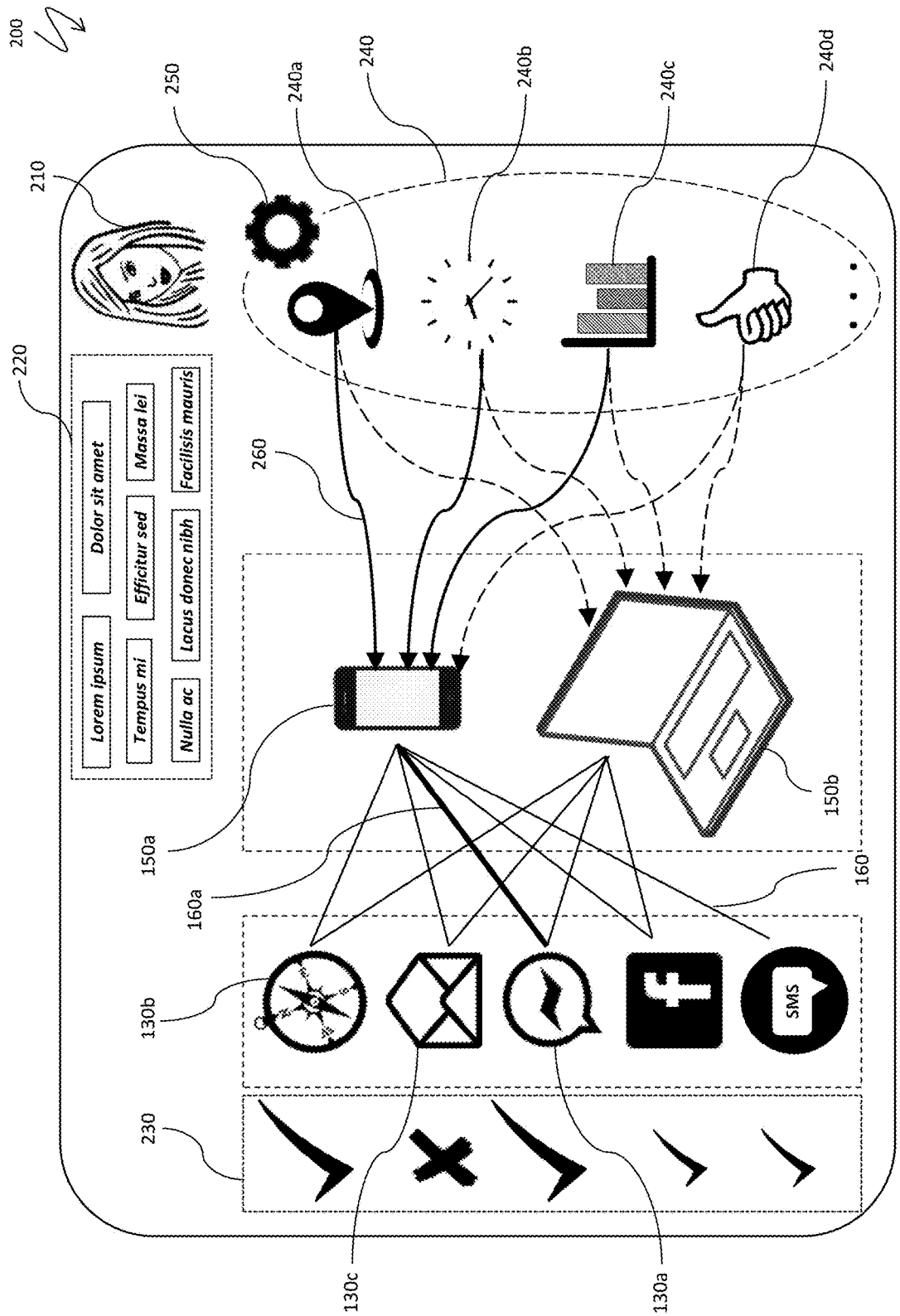
FIG. 2 is a schematic illustration of user profile and routing logic, according to an embodiment of the system described herein.

FIG. 2 is a schematic illustration 200 of user profile and routing logic. A user 210 has a profile 220, which may include contact information, social media profiles and preferences, a list of installed applications and user devices and other information, which may be made available to the system, partially or fully, subject to privacy considerations. An initial set of user preferences 230 may be part of the user profile 220 or may be recorded separately, for example by responding to a questionnaire the first time the user encounters the chatbot at the start of conversation, as explained elsewhere herein. In FIG. 2, the user 210 designates the FACEBOOK® brand MESSENGER™ messaging application 130a and a web browser 130b as most preferred conversational methods and rejects email application(s) 130c as conversational means. The user 210 also describes to the system a list of user devices, which includes in FIG. 2 a smartphone 150a and a notebook computer 150b. Additionally, the user 210 may offer to the system an initial list 160 of conversational venues, that is, register available pairings of messaging applications and user devices utilized during conversations. Alternatively, the system may dynamically build a list of conversational venues by recording message delivery, availability of user devices and user feedback.

The system may provide optimal routing of chatbot driven conversations by continuously assessing routing factors 240, such as user geographic location 240a, timing 240b, usage analytics 240c, user sentiments 240d and other parameters and usage aspects, and employing routing logic 250 to aggregate relevant factors into system choices, as illustrated by arrows 260. In FIG. 2, bold ones of the arrows 260 correspond to three most relevant factors in the example of FIG. 2, the geographic location 240a, the timing 240b, and the usage analytics 240c, which resulted in choosing an optimal conversation venue 160a (shown as bold connector); specifically, a next message is delivered via the FACEBOOK® brand MESSENGER™ messaging application 130a to a smartphone 150a of the user.

Figure 3:
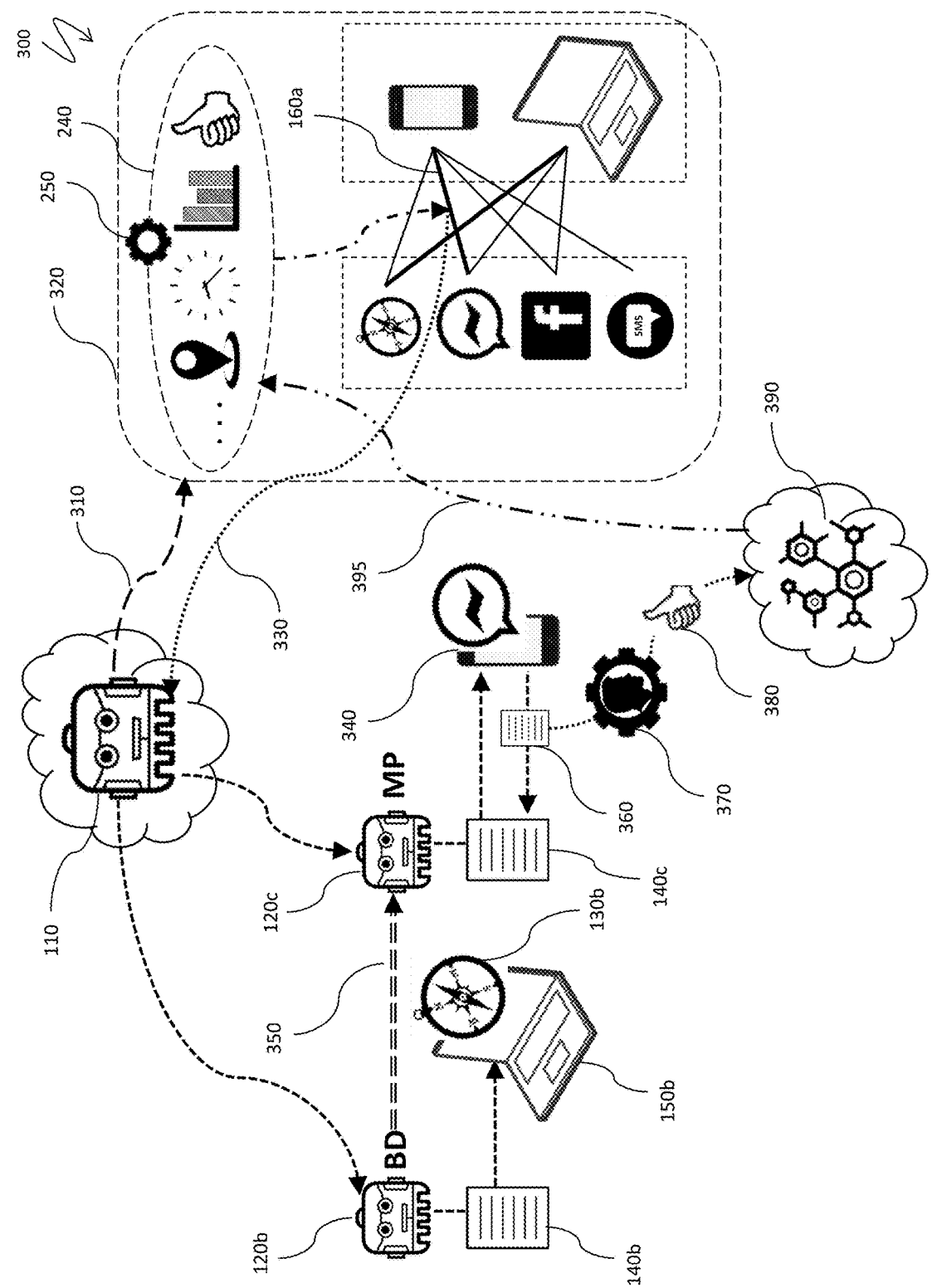
FIG. 3 is a schematic illustration of conversation routing progress and system learning, according to an embodiment of the system described herein.

FIG. 3 is a schematic illustration 300 of conversation routing progress and system learning. As a starting point of a chatbot driven conversational path, the Superbot 110 designates a platform chatbot 120b to delivers the initial fragment(s) 140b of the conversation via a web browser 130b to a notebook computer 150b. Subsequently, the system optimizes the conversational path, that is, the sequential choice of conversational venues. To accomplish this, the Superbot 110 sends a routing request 310 to the routing engine 320, which may include the routing logic module 250, which assesses the routing factors 240, as explained elsewhere herein (see, for example, FIG. 2, a fragment of which is included in FIG. 3). Based on the routing logic, the system chooses a conversation venue 160a, as explained in the accompanying text to FIG. 2, and communicates a choice as a response to a routing request 310, as illustrated by an arrow 330. Based on the response to the routing request 310, the Superbot 110 designates a platform bot 120c to handle a next phase of the conversational path, whereby a message 140c is delivered to a pairing 340 of the FACEBOOK® brand MESSENGER™ messaging application running on a smartphone of the user, thus representing the conversation venue 160a. In this manner, by employing a routing engine where necessary, the system implements an optimal conversational path 350.

At some or all steps of a conversation, a user may respond to a chatbot message with a user message 360, asking a question, providing necessary information to a platform chatbot (for example, in e-commerce or customer support conversational systems) or assessing the choice of conversational venue. The system may use an NLP component 370 to parse and analyze user feedback 360, retrieve user sentiments 380 and, in the event such user sentiments are related to user assessment of the routing engine, the system may use machine learning 390 to improve routing logic and modify the routing engine, as illustrated by an arrow 395. Note that user sentiments are also included as a routing factor 240d in FIG. 2.

Figure 4:
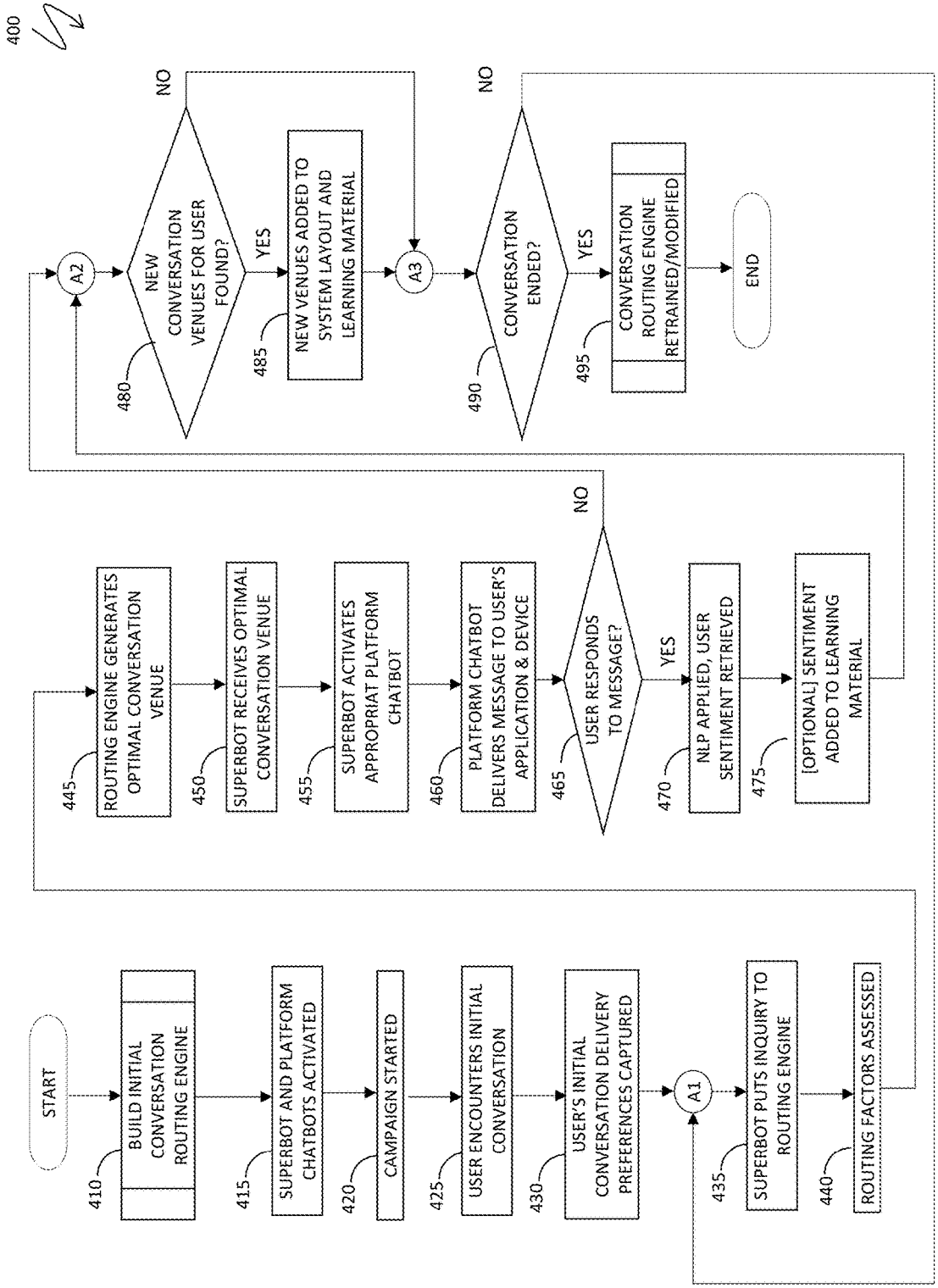
FIG. 4 is a system flow diagram illustrating system functioning in connection with optimization of a conversation path, according to an embodiment of the system described herein.

Referring to FIG. 4, a system flow diagram 300 illustrates system functioning in connection with optimization of a conversation path. Processing begins at a step 410, where the system builds an initial instance of the conversational routing engine. After the step 410, processing proceeds to a step 415, where the Superbot 110 and platform chatbots 120 are activated. After the step 415, processing proceeds to a step 420, where a campaign using the system and aimed at engaging multiple users is started. After the step 420, processing proceeds to a step 425, where a user encounters an initial conversation with a chatbot. After the step 425, processing proceeds to a step 430, where initial conversation delivery preferences of the user are captured, as explained elsewhere herein (see, in particular, FIG. 2 and the accompanying text). After the step 430, processing proceeds to a step 435, where the Superbot puts an inquiry to the routing engine to determine a next step in a conversational path, that is, to reveal a next optimal conversation venue (as explained in details in FIGS. 2, 3 and the accompanying text). After the step 435, processing proceeds to a step 440, where relevant routing factors are assessed, as illustrated in FIG. 2 and explained in the associated text.

After the step 440, processing proceeds to a step 445, where the routing engine generates an optimal conversation venue using routing logic based on an assessment of routing factors at the previous step 440. After the step 345, processing proceeds to a step 450, where the Superbot receives an optimal conversation venue from the routing engine. After the step 450, processing proceeds to a step 455, where the Superbot activates an appropriate platform chatbot associated with a messaging application and user device employed for the optimal conversation venue. After the step 455, processing proceeds to a step 460, where the initiated platform chatbot delivers a next message along the conversation path to the user application and device associated with the optimal conversation venue.

After the step 460, processing proceeds to a test step 465, where it is determined whether the user responds to the chatbot message. If so, processing proceeds to a step 470, where an NLP (Natural Language Processing) module is applied to a response of the user and user sentiment (if any) is retrieved. After the step 470, processing proceeds a step 475, where the retrieved sentiment may be optionally added to learning material, provided that the sentiment is relevant to assessment of routing logic and factors. After the step 475, processing proceeds to a test step 480, where it is determined whether new conversation venues for the user have been identified, for example, retrieved from user feedback or directly communicated by the user. Note that the same test step 480 may be independently reached from a test step 465 if the user did not respond to a chatbot message. If it is determined at the test step 480 that new conversation venues for the user have been identified, processing proceeds to a step 485, where the system adds new venues (applications and/or user devices) to a customized system layout for the user and to learning materials. After the step 485, processing proceeds to a test step 490, where it is determined whether the conversation has ended. Note that the test step 490 may be independently reached from the test step 480 if new conversation venues for the user have not been identified. If it is determined at the step 490 that the conversation has ended, processing proceeds to a step 495, where the conversation routing engine is retrained and possibly modified based on learning material accumulated at previous steps. Otherwise, processing proceeds back to the step 435, discussed above, which may be independently reached from the step 430, also discussed above. After the step 495, processing is complete.

Various embodiments discussed herein may be combined with each other in appropriate combinations in connection with the system described herein. Additionally, in some instances, the order of steps in the flowcharts, flow diagrams and/or described flow processing may be modified, where appropriate. Subsequently, system configurations, conversational sessions and functions of ACE may vary from the illustrations presented herein. Further, various aspects of the system described herein may be implemented using various messenger applications and social networks and may be deployed on various devices, including, but not limited to smartphones, tablets and other mobile computers. Smartphones and tablets may use operating system(s) selected from the group consisting of: iOS, Android OS, Windows Phone OS, Blackberry OS and mobile versions of Linux OS. Mobile computers and tablets may use operating system selected from the group consisting of Mac OS, Windows OS, Linux OS, Chrome OS.

Software implementations of the system described herein may include executable code that is stored in a computer readable medium and executed by one or more processors. The computer readable medium may be non-transitory and include a computer hard drive, ROM, RAM, flash memory, portable computer storage media such as a CD-ROM, a DVD-ROM, a flash drive, an SD card and/or other drive with, for example, a universal serial bus (USB) interface, and/or any other appropriate tangible or non-transitory computer readable medium or computer memory on which executable code may be stored and executed by a processor. The software may be bundled (pre-loaded), installed from an app store or downloaded from a location of a network operator. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method of providing a consistent conversational experience to a user having multiple platform devices, comprising:

the user providing a list that registers pairings of platform devices of the user and messaging platforms utilized by the user for conversations;

assigning each of a plurality of platform specific artificial conversational entities to at least one of the multiple platform devices using one of: a chatbot integration platform of a particular messaging platform running on each of the devices or available conversational, interaction and integration capabilities of a messaging platform running on each of the devices, each of the plurality of artificial conversation entities providing conversation in at least one of a plurality of different formats on a subset of the platform devices;

determining preferences of the user regarding timing and use on the multiple platform devices;

initially selecting a particular conversational venue corresponding to one of the multiple platform devices of the user paired with a messaging platform and a corresponding one of the platform specific artificial conversational entities according to routing logic that uses the preferences of the user according to the list of pairings registered by the user and at least one of: geographic location of the user, timing, which of the multiple platform devices are available and active, additional information about installed and registered messaging platforms and applications, situational analysis, and user feedback; and providing a conversation with the user via the particular conversational venue.

2. A method, according to claim 1, wherein the preferences of the user are determined using contact information of the user and social media profiles of the user.

3. A method, according to claim 1, wherein a Superbot coordinates use of particular ones of the platform specific artificial conversational entities.

4. A method, according to claim 1, wherein the preferences are provided by having the user respond to a questionnaire a first time when the user encounters one of the platform specific artificial conversational entities.

5. A method, according to claim 1, wherein the installed and registered messaging platforms and applications include at least one of: a web browser, an email application, a unified or a specialized mobile and/or desktop messenger, social networks, and mobile and other SMS applications.

6. A method, according to claim 5, wherein the unified mobile and desktop messenger is one of: FACEBOOK® brand MESSENGER™ messaging application, the SLACK® communication application, the MICROSOFT TEAMS® messaging application, TWITTER® social networking services, SNAPCHAT® services, LINE™ software, WECHAT® services, the KAKAO TALK® Internet chat rooms, SKYPE® communication services, WHATSAPP® communication services and/or VIBER® communication services.

7. A method, according to claim 1, further comprising:
reselecting a new conversational venue corresponding to one of the multiple platform devices and a corresponding one of the platform specific artificial conversational entities using the routing logic module to assess at least one of: the geographic location of the user, the timing, which of the multiple platform devices are available and active, the installed and registered messaging platforms and applications, the situational analysis, and the user feedback following initial communication with the user.

8. A method, according to claim 7, wherein reselecting a new conversational venue includes providing a routing request by a Superbot to the routing logic module that chooses a conversation venue and designating by the Superbot a particular one of the platform specific artificial conversational entities for the new conversational venue.

9. A method, according to claim 8, wherein the Superbot is provided in a cloud.

10. A method, according to claim 1, wherein the user responds to the particular one of the platform specific artificial conversational entities.

11. A method, according to claim 10, wherein the user response is analyzed using a natural language processing module that separates the response into a conversational portion in which the user converses with a particular one of the platform specific artificial conversational entities and an assessment portion in which the user evaluates suitability of the conversational venue.

12. A method, according to claim 11, wherein the conversational portion includes at least one of: asking a question and providing information for a transaction to the particular one of the platform specific artificial conversational entities.

13. A method, according to claim 11, wherein the natural language processing module determines user sentiment based on the assessment portion.

14. A method, according to claim 13, further comprising:
reselecting a new conversational venue corresponding to one of the multiple platform devices according to user sentiment.

15. A method, according to claim 14, wherein routing logic is used to reselect the conversational venue and wherein the user sentiment is one of a plurality of factors that modify the routing logic.

16. A non-transitory computer-readable medium containing software that provides a consistent conversational experience to a user having multiple platform devices, the software comprising:
executable code that provides a list that registers pairings of platform devices of the user and messaging platforms utilized by the user for conversations;
executable code that assigns each of a plurality of platform specific artificial conversational entities to at least one of the multiple platform devices using one of: a chatbot integration platform of a particular messaging platform running on each of the devices or available conversational, interaction and integration capabilities of a messaging platform running on each of the devices, each of the plurality of artificial conversation entities providing conversation in at least one of a plurality of different formats on a subset of the platform devices;
executable code that determines preferences of the user regarding timing and use on the multiple platform devices;
executable code that initially selects a particular conversational venue corresponding to one of the multiple platform devices of the user paired with a messaging platform and a corresponding one of the platform specific artificial conversational entities according to routing logic that uses the preferences of the user according to the list of pairings registered by the user and at least one of: geographic location of the user, timing, which of the multiple platform devices are available and active, additional information about installed and registered messaging platforms and applications, situational analysis, and user feedback; and
executable code that provides a conversation with the user via the particular conversational venue.

17. A non-transitory computer-readable medium, according to claim 16, wherein the preferences of the user are determined using contact information of the user and social media profiles of the user.

18. A non-transitory computer-readable medium, according to claim 16, wherein a Superbot coordinates use of particular ones of the platform specific artificial conversational entities.

19. A non-transitory computer-readable medium, according to claim 16, wherein the preferences are provided by having the user respond to a questionnaire a first time when the user encounters one of the platform specific artificial conversational entities.

20. A non-transitory computer-readable medium, according to claim 16, wherein the installed and registered messaging platforms and applications include at least one of: a web browser, an email application, a unified or a specialized mobile and/or desktop messenger, social networks, and mobile and other SMS applications.

21. A non-transitory computer-readable medium, according to claim 20, wherein the unified mobile and desktop messenger is one of: FACEBOOK® brand MESSENGER™ messaging application, the SLACK® communication application, the MICROSOFT TEAMS® messaging application, TWITTER® social networking services, SNAPCHAT® services, LINE™ software, WECHAT® services, the KAKAO TALK® Internet chat rooms, SKYPE® communication services, WHATSAPP® communication services and/or VIBER® communication services.

22. A non-transitory computer-readable medium, according to claim 16, further comprising:
   executable code that reselects a new conversational venue corresponding to one of the multiple platform devices and a corresponding one of the platform specific artificial conversational entities using the routing logic module to assess at least one of: the geographic location of the user, the timing, which of the multiple platform devices are available and active, the installed and registered messaging platforms and applications, the situational analysis, and the user feedback following initial communication with the user.

23. A non-transitory computer-readable medium, according to claim 22, wherein executable code that reselects a new conversational venue provides a routing request by a Superbot to the routing logic module that chooses a conversation venue and wherein the Superbot designates a particular one of the platform specific artificial conversational entities for the new conversational venue.

24. A non-transitory computer-readable medium, according to claim 23, wherein the Superbot is provided in a cloud.

25. A non-transitory computer-readable medium, according to claim 16, wherein the user responds to the particular one of the platform specific artificial conversational entities.

26. A non-transitory computer-readable medium, according to claim 25, wherein the user response is analyzed using a natural language processing module that separates the response into a conversational portion in which the user converses with a particular one of the platform specific artificial conversational entities and an assessment portion in which the user evaluates suitability of the conversational venue.

27. A non-transitory computer-readable medium, according to claim 26, wherein the conversational portion includes at least one of: asking a question and providing information for a transaction to the particular one of the platform specific artificial conversational entities.

28. A non-transitory computer-readable medium, according to claim 26, wherein the natural language processing module determines user sentiment based on the assessment portion.

29. A non-transitory computer-readable medium, according to claim 28, further comprising:
   executable code that reselects a new conversational venue corresponding to one of the multiple platform devices according to user sentiment.

30. A non-transitory computer-readable medium, according to claim 29, wherein routing logic is used to reselect the conversational venue and wherein the user sentiment is one of a plurality of factors that modify the routing logic.

* * * * *